(12) United States Patent
Lee et al.

(10) Patent No.: US 8,755,167 B2
(45) Date of Patent: Jun. 17, 2014

(54) CERAMIC SHEET PRODUCT FOR CERAMIC ELECTRONIC COMPONENT, MULTILAYER CERAMIC ELECTRONIC COMPONENT USING THE SAME AND METHOD OF MANUFACTURING MULTILAYER CERAMIC ELECTRONIC COMPONENT

(75) Inventors: Kwang Jik Lee, Gyunggi-do (KR); Suk Jin Ham, Seoul (KR); Ji Hyuk Lim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 222 days.

(21) Appl. No.: 13/289,454

(22) Filed: Nov. 4, 2011

(65) Prior Publication Data

US 2012/0268861 A1    Oct. 25, 2012

(30) Foreign Application Priority Data

Apr. 21, 2011  (KR) .................. 10-2011-0037261

(51) Int. Cl.
   *H01G 4/06*    (2006.01)
(52) U.S. Cl.
   USPC ..... 361/321.2; 361/303; 361/305; 361/321.1; 361/306.1; 361/306.3
(58) Field of Classification Search
   USPC ........... 361/321.2, 321.1, 303–305, 311–313, 361/306.1, 306.3, 301.2, 301.4
   See application file for complete search history.

(56) References Cited

U.S. PATENT DOCUMENTS

| | | | |
|---|---|---|---|
| 7,271,434 B2* | 9/2007 | Kellar et al. | 257/309 |
| 8,351,180 B1* | 1/2013 | Ahn et al. | 361/321.2 |
| 8,456,799 B2* | 6/2013 | Chang et al. | 361/321.2 |
| 8,520,364 B2* | 8/2013 | Morito | 361/321.2 |
| 2003/0100189 A1 | 5/2003 | Lee et al. | |
| 2004/0131774 A1 | 7/2004 | Kellar et al. | |
| 2005/0195556 A1 | 9/2005 | Shah | |
| 2010/0284125 A1 | 11/2010 | Moon et al. | |

FOREIGN PATENT DOCUMENTS

| | | |
|---|---|---|
| JP | 2003-168745 A | 6/2003 |
| JP | 2008-103687 A | 5/2008 |
| KR | 10-2011-0003080 A | 1/2011 |

OTHER PUBLICATIONS

Japanese Office Action, w/ English translation thereof, issued in Japanese Patent Applicaton No. JP 2011-234773 dated Oct. 23, 2012.

* cited by examiner

*Primary Examiner* — Nguyen T Ha
(74) *Attorney, Agent, or Firm* — McDermott Will & Emery LLP

(57) ABSTRACT

There are provided a ceramic sheet product for a ceramic electronic component, a multilayer ceramic electronic component using the same, and a method of manufacturing the multilayer ceramic electronic component. The ceramic sheet product for a ceramic electronic component includes a ceramic layer; a metal layer formed on the ceramic layer; and metal nanostructures contacting the metal layer and protruding from the metal layer to an inner portion of the ceramic layer. With the multilayer ceramic electronic component using the ceramic sheet product for a ceramic electronic component, an interval between electrodes is reduced to thereby allow for the increase of capacitance, whereby a multilayer ceramic electronic component having high capacitance may be provided.

5 Claims, 6 Drawing Sheets

CERAMIC SHEET PRODUCT FOR CERAMIC ELECTRONIC COMPONENT, MULTILAYER CERAMIC ELECTRONIC COMPONENT USING THE SAME AND METHOD OF MANUFACTURING MULTILAYER CERAMIC ELECTRONIC COMPONENT

CROSS-REFERENCE TO RELATED APPLICATIONS

This application claims the priority of Korean Patent Application No. 10-2011-0037261 filed on Apr. 21, 2011, in the Korean Intellectual Property Office, the disclosure of which is incorporated herein by reference.

BACKGROUND OF THE INVENTION

1. Field of the Invention

The present invention relates to a ceramic sheet product for a ceramic electronic component, a high capacitance multilayer ceramic electronic component using the same, and a method of manufacturing the multilayer ceramic electronic component.

2. Description of the Related Art

In accordance with the recent trend for the miniaturization of electronic products, the demand for multilayer ceramic electronic components having a small size and large capacity has increased. Therefore, an attempt at thinning and multi-layering dielectric layers and internal electrodes have been undertaken through various methods. Recently, as the thickness of the dielectric layer has been thinned, multilayer ceramic electronic components having an increased number of stacked dielectric layers have been manufactured.

However, there is a need to efficiently design a structure between a ceramic and an internal electrode layer through new technology in order to manufacture a multilayer ceramic electronic component having larger capacitance.

In accordance with this demand, efforts for reducing an interval between electrodes while simultaneously increasing a surface area of the electrodes have been conducted to now.

SUMMARY OF THE INVENTION

An aspect of the present invention provides a ceramic sheet product for a ceramic electronic component, a high capacitance multilayer ceramic electronic component using the same, and a method of manufacturing the multilayer ceramic electronic component.

According to an aspect of the present invention, there is provided a ceramic sheet product for a ceramic electronic component, the ceramic sheet product including: a ceramic layer; a metal layer formed on the ceramic layer; and metal nanostructures contacting the metal layer and protruding from the metal layer to an inner portion of the ceramic layer.

The metal nanostructures may have a height less than that of the ceramic layer.

The metal nanostructures may be cylindrical and have a star shaped cross section.

The metal nanostructures may be made of the same kind of material as that of the metal layer.

According to another aspect of the present invention, there is provided a method of manufacturing a ceramic sheet product for a ceramic electronic component, the method including: preparing metal nanostructures; transferring the metal nanostructures to a ceramic green sheet having a ceramic layer formed thereon so as to protrude to an inner portion of the ceramic layer; and forming a metal layer on the ceramic green sheet so as to contact the metal nanostructures.

The metal nanostructures may have a height less than that of the ceramic layer.

The preparing of metal nanostructures may include patterning a polymer matrix through a nanoimprinting method and growing the metal nanostructures.

The growing of the metal nanostructures may be performed by an electrochemical method or a deposition method.

The metal nanostructures may be made of the same kind of material as that of the metal layer.

According to another aspect of the present invention, there is provided a multilayer ceramic electronic component including: a ceramic body having a plurality of dielectric layers and a plurality of internal electrode layers, alternately stacked therein; metal nanostructures contacting the internal electrode layers and protruding from the internal electrode layers to inner portions of the dielectric layers; and external electrodes formed on end surfaces of the ceramic body and electrically connected to the internal electrodes.

The metal nanostructures may have a height less than that of the dielectric layers.

The metal nanostructures may be cylindrical, may have a star shaped cross section, and may be made of the same kind of material as that of the internal electrode layers.

According to another aspect of the present invention, there is provided a method of manufacturing a multilayer ceramic electronic component, the method including: preparing metal nanostructures; transferring the metal nanostructures to a ceramic green sheet having a dielectric layer formed thereon so as to protrude to an inner portion of the dielectric layer; preparing an internal electrode layer on the ceramic green sheet so as to contact the metal nanostructures; forming a laminate by stacking several layers of the ceramic green sheet in which the dielectric layer, the internal electrode layer formed on the dielectric layer, and the metal nanostructures contacting the internal electrode layer and protruding to the inner portion of the dielectric layer are formed; manufacturing a green chip by compressing and cutting the laminate; and manufacturing a ceramic body by firing the green chip.

The nanostructures may have a height less than that of the dielectric layer.

The preparing of the metal nanostructures may include patterning a polymer matrix through a nanoimprinting method and growing the metal nanostructures.

The growing of the metal nanostructures may be performed by an electrochemical method or a deposition method.

The metal nanostructures may be made of the same kind of material as that of the internal electrode layer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
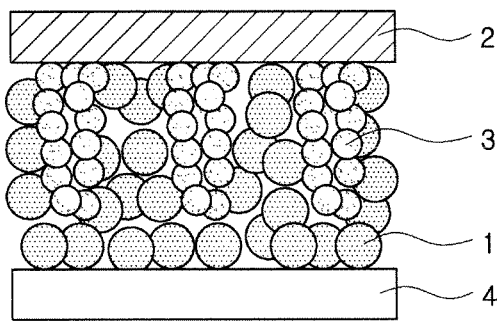
FIG. 1 is a cross-sectional view schematically showing a ceramic sheet product for a ceramic electronic component according to an embodiment of the present invention.

The embodiments of the present invention may be modified in many different forms and the scope of the invention should not be construed as being limited to the embodiments set forth herein. Rather, these embodiments are provided so that this disclosure will be thorough and complete, and will fully convey the concept of the invention to those skilled in the art. In the drawings, the shapes and dimensions of elements may be exaggerated for clarity, and the same reference numerals will be used throughout to designate the same or like components.

Embodiments of the present invention will now be described in detail with reference to the accompanying drawings.

FIG. 1 is a cross-sectional view schematically showing a ceramic sheet product for a ceramic electronic component according to an embodiment of the present invention.

Referring to FIG. 1, a ceramic sheet product 10 for a ceramic electronic component according to an embodiment of the present invention may include a ceramic layer 1, a metal layer 2 formed on the ceramic layer 1, and metal nanostructures 3 contacting the metal layer 2 and protruding from the metal layer 2 to an inner portion of the ceramic layer 1.

The ceramic sheet product 10 for a ceramic electronic component according to an embodiment of the present invention, which is in a state before being used to manufacture a multilayer ceramic electronic component, may be formed on a carrier film 4 to thereby be completed.

The ceramic layer 1 may be made of any material so long as it is a generally used material, for example, barium titanate (BaTiO$_3$), or the like, and may have a thickness of 2 μm or less.

The metal layer 2 may be made of at least one among silver (Ag), lead (Pb), platinum (Pt), nickel (Ni), copper (Cu) and the like or a mixture of at least two thereof.

The metal layer 2 may have a thickness of 0.3 to 1.0 μm.

The ceramic sheet product 10 for a ceramic electronic component according to an embodiment of the present invention may include the metal nanostructures 3 contacting the metal layer 2 and protruding from the metal layer 2 to the inner portion of the ceramic layer 1.

The metal nanostructure 3 may have variously changed heights according to an embodiment of the present invention and may have a height less than that of the ceramic layer 1.

In the case of stacking several layers of the ceramic sheet product, when the metal nanostructure has the same height as that of the ceramic layer, it may contact a lower metal layer (not shown) contacting the ceramic layer, thereby causing a short circuit. Therefore, the metal nanostructure 3 may have a height less than that of the ceramic layer.

In addition, the metal nanostructure 3 may have a height of 2 μm or less, which is smaller than a thickness of the ceramic layer 1, in order to prevent the short circuit.

Further, the metal nanostructure 3 is not limited in terms of a shape thereof. For example, the metal nanostructure 3 may be cylindrical shape and have a star shaped cross section.

Particularly, when the metal nanostructure 3 is cylindrical shape having a star shaped cross section, a surface area of the metal nanostructure 3 is further increased to thereby allow for the further increase of capacitance. In addition, the metal nanostructure 3 may be made of any material as long as it is a general metal; however, it may be made of a material the same as that of the metal layer 2.

According to an embodiment of the present invention, since the ceramic sheet product 10 includes the metal nanostructures 3 made of the same kind of material as that of the metal layer 2, the surface area of metals may be increased. Particularly, in order to maximize capacitance, the metal nanostructure 3 may be made of a material the same as that of the metal layer 2.

Meanwhile, positions in which the metal nanostructures 3 are formed are not specially limited. For example, in the case of stacking several layers of the ceramic sheet product 10, the metal nanostructures 3 may contact each of the metal layers 2 formed on upper and lower portions of the ceramic layer 1 and protrude from each of the metal layers 2 to the inner portion of the ceramic layer 1.

In this case, in order to prevent a short circuit, the metal nanostructures 3 should not contact each other in the inner portion of the ceramic layer 1.

The ceramic sheet product 10 for a ceramic electronic component according to an embodiment of the present invention may include the metal nanostructure 3 protruding from the metal layer 2 to the inner portion of the ceramic layer 1, such that an interval between the metal layers may be reduced to allow for the increase of capacitance, in the case of stacking several layers of the ceramic sheet product 10. Capacitance may be obtained from the following Equation.

$$C = \varepsilon_0 \varepsilon_r \frac{A}{d} \quad \text{[Equation]}$$

Where C indicates capacitance, ∈ indicates permittivity, A indicates a surface area of a metal, and d indicates an interval between metal layers.

That is, it may be appreciated from the above Equation that the more the interval d between the metal layers is reduced and the surface area A of the metal is increased, the more capacitance is increased.

Therefore, according to an embodiment of the present invention, in the case of stacking several layers of the ceramic sheet product, the interval between the metal layers is reduced, such that the capacitance may be increased.

Figure 2:
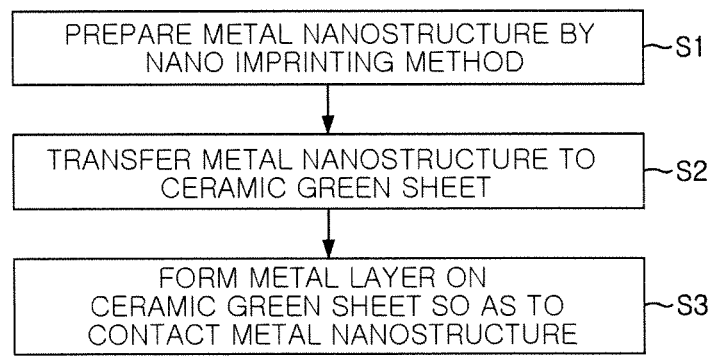
FIG. 2 is a view showing a process of manufacturing a ceramic sheet product for a ceramic electronic component according to an embodiment of the present invention.

FIG. 2 is a view showing a process of manufacturing a ceramic sheet product for a ceramic electronic component according to an embodiment of the present invention.

Figure 3:
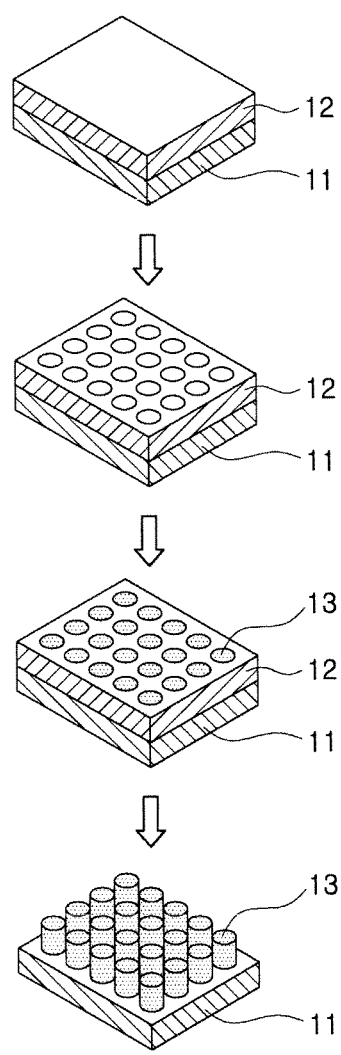
FIG. 3 is a flowchart showing a process of manufacturing a metal nanostructure according to an embodiment of the present invention.

FIG. 3 is a flowchart showing a process of manufacturing a metal nanostructure according to an embodiment of the present invention.

Referring to FIGS. 2 and 3, a method of manufacturing a ceramic sheet product for a ceramic electronic component according to an embodiment of the present invention may include preparing metal nanostructures 13 (S1); transferring the metal nanostructures 13 to a ceramic green sheet having a ceramic layer formed thereon so as to protrude to an inner portion of the ceramic layer (S2); and forming a metal layer on the ceramic green sheet so as to contact the metal nanostructures (S3).

In the method of manufacturing a ceramic sheet product for a ceramic electronic component according to an embodiment of the present invention, the metal nanostructures may be prepared by patterning a polymer matrix 12 through a nanoimprinting method and then growing the metal nanostructures (S1).

A flowchart of a process of preparing the metal nanostructures 13 is shown in FIG. 3.

Referring to FIG. 3, the process of preparing the metal nanostructures may be performed by the nanoimprinting method.

More specifically, the polymer matrix 12 may be coated on a surface of a substrate 11.

The polymer matrix 12 may be not specially limited but may be, for example, polymethylmethacrylate (PMMA).

Next, the polymer matrix on the surface of the substrate may be patterned by a nanoimprint lithography (NIL) technology.

More specifically, the polymer matrix may be pressed at a high pressure by a concave and convex-shaped stamp at a temperature of 140 to 180° C., which is a high temperature corresponding to a glass transition temperature or more of the PMMA, and be then cooled to 100° C. or less to thereby be separated from the stamp.

Therefore, nano patterns formed on the polymer matrix 12 are transferred onto the substrate in the form of an intaglio in which the concave and convex shape of the stamp is reflected.

Then, the metal nanostructures 13 may be grown by uniformly forming at least one material among silver (Ag), lead (Pb), platinum (Pt), nickel (Ni), copper (Cu) and the like or a mixture of at least two thereof over an upper surface of the substrate 11.

A method for growing the metal nanostructures 13 may not be specially limited. For example, the metal nanostructures 13 may be grown by an electrochemical method or a deposition method.

Thereafter, through thermosetting and etching processes, the portion of the polymer matrix 12, on which the nano patterns are not formed, may be removed.

As a result, the metal nanostructures 13 formed on the substrate 11 may be prepared.

Figure 4A:
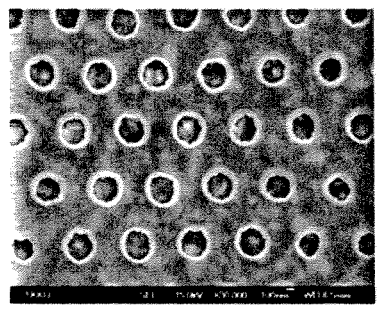
FIG. 4A is a scanning electron microscope (SEM) photograph of a polymer matrix after a nano imprint lithography (NIL) process.
Figure 4B:
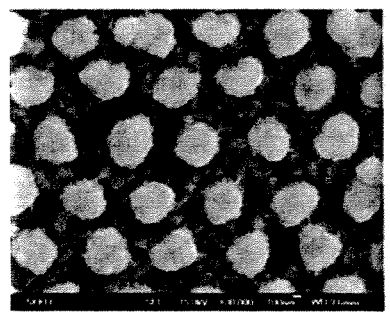
FIGS. 4B and 4C are SEM photographs of metal nanostructures after the NIL process.
Figure 4C:
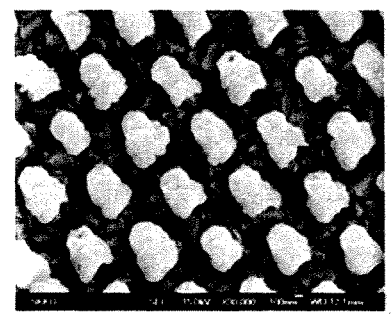

FIG. 4A is a scanning electron microscope (SEM) photograph of a polymer matrix after a nano imprint lithography (NIL) process; and FIGS. 4B and 4C are SEM photographs of metal nanostructures after the NIL process.

A SEM image after the NIL process is performed on the polymer matrix on the substrate is shown in FIG. 4A. It may be appreciated from FIG. 4A that the nano patterns are transferred in the form of an intaglio to the polymer matrix.

In addition, SEM images in which the metal nanostructures are formed on the substrate are shown in FIGS. 4B and 4C.

Next, the metal nanostructures 13 may be transferred to the ceramic green sheet having the ceramic layer formed thereon so as to protrude to the inner portion of the ceramic layer (S2).

The ceramic green sheet having the ceramic layer formed thereon may be manufactured by a known method.

Since the metal nanostructures 13 are previously designed and formed to have a height less than that of the ceramic layer, they do not contact a lower carrier film having the ceramic layer formed thereon.

Thereafter, the substrate 11 is removed, whereby the ceramic green sheet having the metal nanostructures 13 protruding to the inner portion of the ceramic layer may be prepared.

Next, the metal layer may be formed on the ceramic green sheet so as to contact the metal nanostructures (S3).

The metal layer may be formed by a general method. For example, the metal layer may be formed by dispensing a conductive paste and moving a squeegee in one direction.

Characteristics of the ceramic sheet product according to the embodiment of the present invention, except for the method for manufacturing the ceramic sheet product, are the same as those of the ceramic sheet product according to the predescribed embodiment of the present invention.

Figure 5:
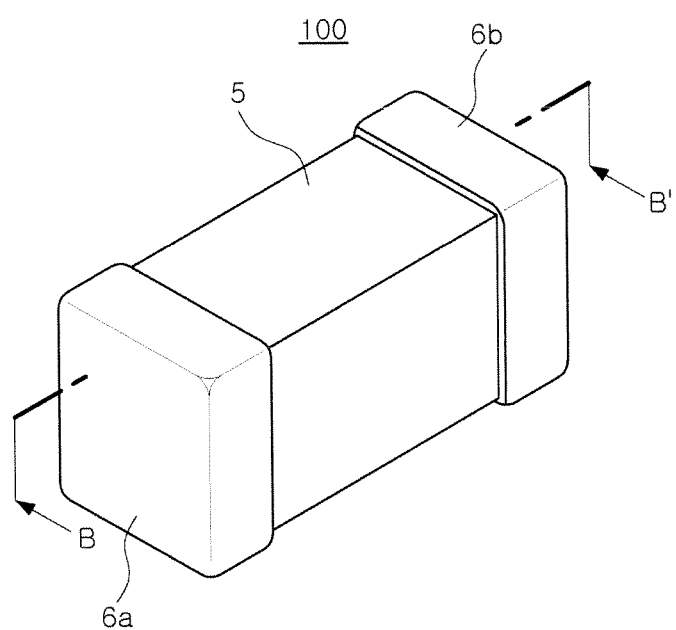
FIG. 5 is a perspective view schematically showing a multilayer ceramic capacitor according to an embodiment of the present invention.

FIG. 5 is a perspective view schematically showing a multilayer ceramic capacitor according to an embodiment of the present invention.

Figure 6:
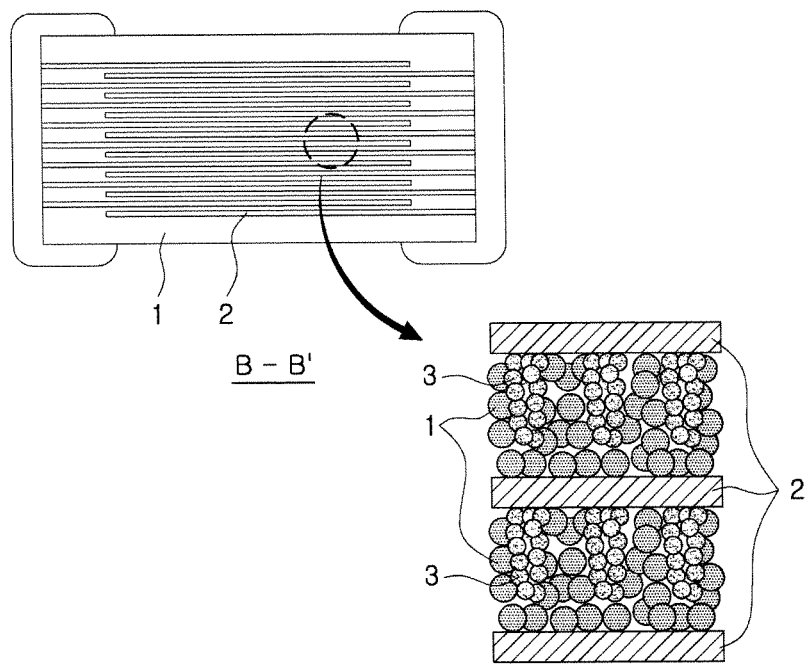
FIG. 6 is a cross-sectional view of the multilayer ceramic capacitor taken along line B-B' of FIG. 5.

FIG. 6 is a cross-sectional view of the multilayer ceramic capacitor taken along line B-B' of FIG. 5.

Referring to FIGS. 5 and 6, a multilayer ceramic electronic component according to an embodiment of the present invention may include a ceramic body 5 having a plurality of dielectric layers 1 and a plurality of internal electrode layers 2, alternately stacked therein; metal nanostructures 3 contacting the internal electrode layers 2 and protruding from the internal electrode layers 2 to inner portions of the dielectric layers 1; and external electrodes 6A and 6A formed on end surfaces of the ceramic body 5 and electrically connected to the internal electrodes.

Hereinafter, a multilayer ceramic electronic component according to an embodiment of the present invention, particularly, a multilayer ceramic capacitor 100 will be described. However, the present invention is not limited thereto.

In addition, the ceramic layer of the ceramic sheet product will be represented as a dielectric layer in a multilayer ceramic electronic component, and the metal layer of the ceramic sheet product will represented as an internal electrode layer in the multilayer ceramic electronic component. The ceramic layer and the dielectric layer or the metal layer and the internal electrode layer are only different representations for the same object.

The multilayer ceramic capacitor 100 according to an embodiment of the present invention may include the ceramic body 5 having the plurality of dielectric layers 1 and the plurality of internal electrode layers 2, alternately stacked therein; and the external electrodes 6A and 6A formed on the end surfaces of the ceramic body 5 and electrically connected to the internal electrodes.

Particularly, the multilayer ceramic capacitor 100 according to an embodiment of the present invention may include the metal nanostructures 3 contacting the internal electrode layers 2 and protruding from the internal electrode layers 2 to the inner portions of the dielectric layers 1.

As shown in FIG. 6, the ceramic body 5 may include the metal nanostructures 3 as well as the plurality of dielectric layers 1 and the plurality of internal electrode layers 2 stacked therein.

Therefore, an interval between the internal electrodes may be reduced to thereby allow for the increase of capacitance.

That is, according to an embodiment of the present invention, the metal nanostructures 3 contacting the internal electrode layers 2 and protruding from the internal electrode layers 2 to the inner portions of the dielectric layers 1 are formed in interfaces between the dielectric layers 1 and the internal electrode layers 2, and the dielectric layers 1 and the internal electrode layers 2 are alternately stacked, whereby the multilayer ceramic capacitor having high capacitance may be provided.

A height, a material, a shape of the metal nanostructure 3 are the same as those of the above-mentioned ceramic sheet product. Therefore, a description thereof will be omitted.

In addition, a material, a thickness, or the like, of the dielectric layer and the internal electrode layer are not specially limited but are the same as those of the above-mentioned ceramic sheet product.

Figure 7:
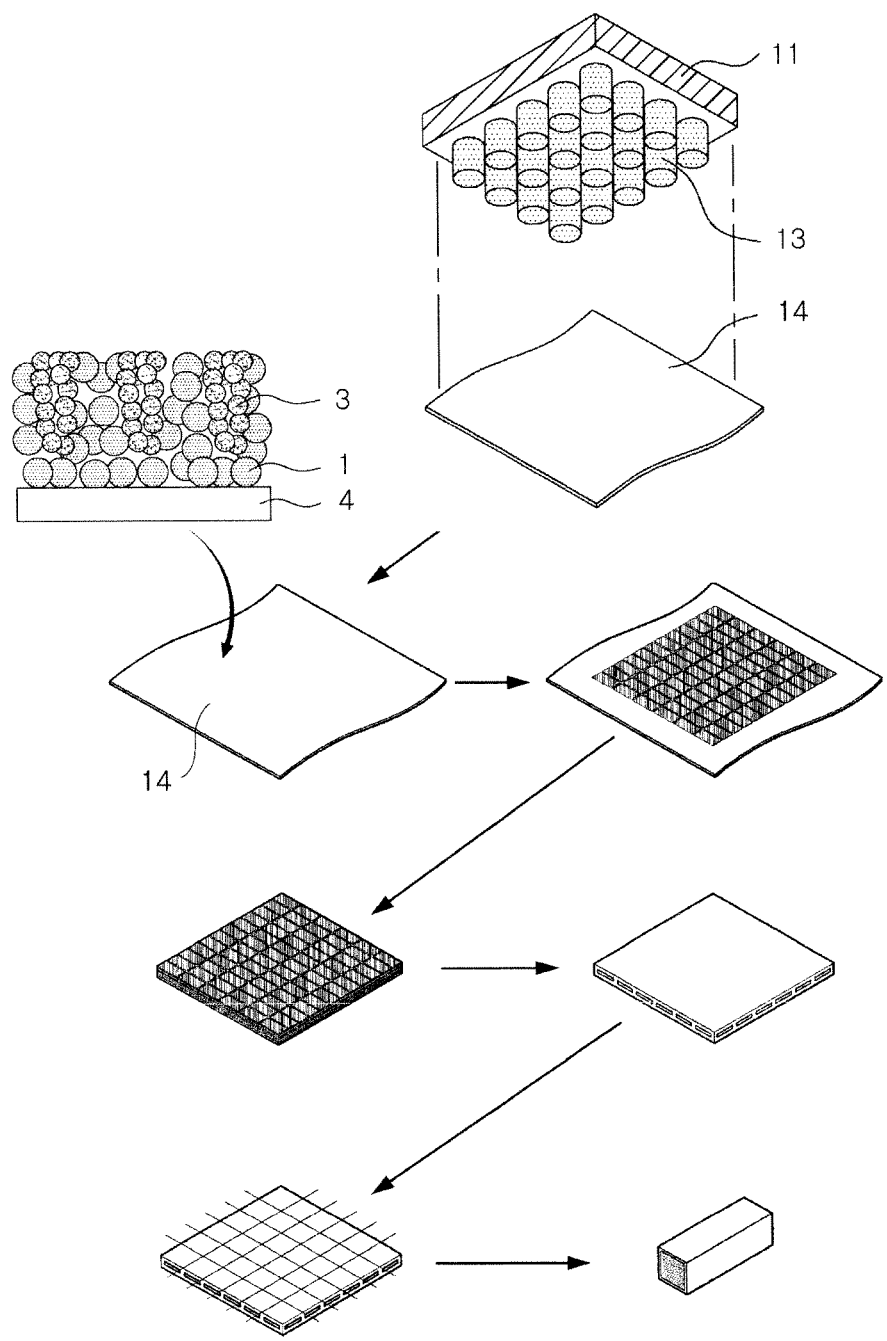
FIG. 7 is a view showing a process of manufacturing a multilayer ceramic capacitor according to an embodiment of the present invention.

FIG. 7 is a view showing a process of manufacturing a multilayer ceramic capacitor according to an embodiment of the present invention.

Referring to FIG. 7, a method of manufacturing a multilayer ceramic electronic component according to an embodiment of the present invention may include preparing metal nanostructures; transferring the metal nanostructures to a ceramic green sheet having a dielectric layer formed thereon so as to protrude to an inner portion of the dielectric layer; forming an internal electrode layer on the ceramic green sheet so as to contact the metal nanostructures; forming a laminate by stacking the ceramic green sheets in which the dielectric layer, the internal electrode layer formed on the dielectric layer, and the metal nanostructures contacting the internal electrode layer and protruding to the inner portion of the dielectric layer are formed; manufacturing a green chip by compressing and cutting the laminate; and manufacturing a ceramic body by firing the green chip.

Hereinafter, a description for portions overlapped with the description for the method of manufacturing a ceramic sheet product according to the predescribed embodiment of the present invention will be omitted and a method of manufacturing a multilayer ceramic electronic component, particularly, a multilayer ceramic capacitor, will be described.

First, a plurality of green sheets each including the ceramic layer 1 the metal layer 2 formed on the ceramic layer 1, and the metal nanostructures 3 contacting the metal layer 2 and protruding from the metal layer 2 to the inner portion of the ceramic layer 1 are prepared.

Each of the plurality of green sheets is separated from the carrier film 4 and then the separated green sheets are stacked to be overlapped, thereby forming a green sheet laminate.

Then, the green sheet laminate may be compressed at a high temperature and a high pressure and then cut to have a predetermined size through a cutting process, thereby manufacturing a capacitor body.

Thereafter, the multilayer ceramic capacitor is completed by the performing of a baking process, a firing process, a polishing process, an external electrode forming process, a plating process, and the like.

Hereafter, the present invention will be described in detail with reference to Comparative Example and Inventive Example; however, it is not limited thereto.

A multilayer ceramic capacitor (Inventive Example) according to an embodiment of the present invention and a multilayer ceramic capacitor (Comparative Example) according to the related art were manufactured as described below.

In Inventive Example, a polymer matrix on a surface of a substrate on which a PMMA is first coated was patterned by a NIL technology.

Then, a nickel metal was applied to the patterned surface by a deposition method, grown, and then subjected to thermosetting and etching processes, thereby forming metal nanostructures having a height of 400 nm.

Next, a ceramic green sheet in which a ceramic layer having a thickness of 600 nm is formed was prepared and the metal nanostructures were then formed on the ceramic green sheet by a screen printing method so as to protrude to an inner portion of the ceramic layer.

The ceramic layer was formed by a general method using barium titanate ($BaTiO_3$) powders, and the metal nanostructures had a height less than that of the ceramic layer, such that the metal nanostructures did not contact a lower carrier film having the ceramic layer formed thereon.

Thereafter, the substrate was removed and a metal layer was formed on the ceramic green sheet by a general method so as to contact the metal nanostructures.

The metal layer was formed by applying a conductive nickel paste, which is the same material as those of the nickel nanostructures protruding to the inner portion of the ceramic layer, and was contacted the nickel nanostructures.

The ceramic green sheets were stacked and were then subjected to processes such as a compressing process, a cutting process, a firing process, or the like, thereby manufacturing the multilayer ceramic capacitor according to an embodiment of the present invention.

The multilayer ceramic capacitor according to the Comparative Example is the same as the multilayer ceramic capacitor according to the related art, and does not include metal nanostructures. The multilayer ceramic capacitor according to the Comparative Example was manufactured under the same conditions as those of an Inventive Example in terms of other conditions such as a size, a thickness, or the like, of the multilayer ceramic capacitor.

In the multilayer ceramic capacitors according to the Inventive Example and the Comparative Example, individual single units, of which a thickness of a dielectric layer is 600 nm, a thickness of an internal electrode layer is 1 μm, a width is 600 nm, and a length is 2 mm were separated and simulated, whereby capacitances of individual single units are compared.

In the case of Inventive Example, the nickel nanostructures having a thickness of 400 nm and protruding to the inner portion of the dielectric layer having a thickness of 600 nm were formed to protrude from an interface between the dielectric layer and the internal electrode layer to the inner portion of the dielectric layer.

The simulation was performed so as to finally calculate the capacitances, starting with the following Equation.

$$Q = CV, W = \frac{1}{2}CV^2, C = \frac{2W}{V^2} \quad \text{[Equation]}$$

$$W = \frac{1}{2}\int \varepsilon_0 \varepsilon_r E^2 dv$$

In the above Equation, W indicates energy density, E indicates an electric field, dv indicates a differential volume component, and $\in$ indicates permittivity.

As a calculation result of the above Equation with respect to an application voltage of 0.1 V, W of $1.77 \times 10^{-14}$[J] was obtained in the case of the Comparative Example and W of $5.12 \times 10^{-14}$[J] was obtained in the case of the Inventive Example.

A result obtained by substituting the above mentioned W values for the above Equation is provided in the following Table 1.

TABLE 1

| | $C = \frac{2W}{V^2}$ | Capacitance [F] |
|---|---|---|
| Comparative Example | $2 \times 1.77 \times 10^{-14}/0.1^2$ | $3.54 \times 10^{-12}$ |
| Inventive Example | $2 \times 5.12 \times 10^{-14}/0.1^2$ | $10.23 \times 10^{-12}$ |

It may be appreciated from the above simulation result that the multilayer ceramic capacitor according to the Inventive Example has capacitance increased by 290%, as compared to that of the Comparative Example.

Therefore, it may be appreciated that the multilayer ceramic capacitor according to the embodiment of the present invention has a reduced distance between the electrodes, to thereby allow for the increase of capacitance, as compared to the multilayer ceramic capacitor according to the related art.

As set forth above, with the ceramic sheet product for a ceramic electronic component and the high capacitance ceramic electronic component using the same according to the embodiments of the present invention, the interval between the internal electrodes is reduced to thereby allow for the increase of capacitance.

While the present invention has been shown and described in connection with the exemplary embodiments, it will be apparent to those in the art that modifications and variations can be made without departing from the spirit and scope of the invention as defined by the appended claims. Accordingly, various substitution, modifications and alteration may be made within the scope of the present invention may be made by those skilled in the art without departing from the spirit of the prevent invention defined by the accompanying claims.

What is claimed is:

1. A multilayer ceramic electronic component comprising:
   a ceramic body having a plurality of dielectric layers and a plurality of internal electrode layers, alternately stacked therein;
   metal nanostructures contacting the internal electrode layers and protruding from the internal electrode layers to inner portions of the dielectric layers; and
   external electrodes formed on end surfaces of the ceramic body and electrically connected to the internal electrodes.

2. The multilayer ceramic electronic component of claim 1, wherein the metal nanostructures have a height less than that of the dielectric layers.

3. The multilayer ceramic electronic component of claim 1, wherein the metal nanostructures are cylindrical.

4. The multilayer ceramic electronic component of claim 1, wherein the metal nanostructures have a star shaped cross section.

5. The multilayer ceramic electronic component of claim 1, wherein metal nanostructures are made of the same kind of material as that of the internal electrode layers.

* * * * *